United States Patent [19]
Peippo

[11] 3,818,626
[45] June 25, 1974

[54] FISH DECOY

[76] Inventor: Emil Peippo, Alousneuvos Katipuk, 70411, Harjavalta, Finland

[22] Filed: July 2, 1973

[21] Appl. No.: 375,443

[52] U.S. Cl............... 43/42.04, 43/35, 43/42.09
[51] Int. Cl............................................ A01k 85/02
[58] Field of Search .......... 43/42.04, 35, 36, 42.08, 43/42.09

[30] Foreign Application Priority Data
July 12, 1972  Finland.......................... 1978/72

[56] References Cited
UNITED STATES PATENTS
2,570,100  10/1951  Collins.............................. 43/42.09
2,596,201  5/1952  Bocchino........................... 43/42.04
2,750,701  6/1956  Beames............................. 43/42.09
3,174,248  3/1965  Hagel................................ 43/42.09
3,739,517  6/1973  Schleif.............................. 43/35
FOREIGN PATENTS OR APPLICATIONS
1,049,090  8/1953  France............................... 43/42.04

Primary Examiner—James H. Czerwonky
Attorney, Agent, or Firm—Burns, Doane, Swecker & Mathis

[57] ABSTRACT

This invention relates to a fish decoy or lure having a body containing an elongated recess open to at least one side of the body and a detachable plate member in the recess comprising a longitudinal bore extending from the front part of the plate member into the recess. A setting pin attached to a fish line extends through the bore for slidable movement therein so that the rear end of the setting pin may protrude into the recess. A fish hook is provided with a loop adapted to fit over the rear end of the setting pin when protruding into the recess. A spring member having one end attached to the plate member and the other end urged against the hook is adapted to eject the hook out of the body when the setting pin is released from the hook loop. A spring wire is attached with one end of the hook and with the other end located at the forward end of the plate member.

6 Claims, 4 Drawing Figures

PATENTED JUN 25 1974 3,818,626

FISH DECOY

BACKGROUND OF THE INVENTION

1. Field of the Invention

The invention relates to the field of weedless fish decoys or lures.

2. Description of the Prior Art

Fish decoys are known in the art in which a recess, situated on the vertical middle plane, extends through the body of the lure. An axle has been placed across the front end of this recess, and a two-pronged elastic loop has been fitted to the axle, and both ends of the loop have been shaped into fishing hooks. These prongs are pulled tautly across each other against a stopper piece provided in the recess, so that the hooks end up in the hollow inside the body of the decoy. To release the hooks into the catching position, an angular lever has been attached with bearings at its apex to the upper part of the recess so that one leg sticks out above the decoy body while the other leg remains close to the stopper. When the lever leg extending above the decoy body is pressed downwards, the lever turns and its other leg releases the fishing hooks from the stopper so that they spring out of the decoy body. To release the hooks into the catching position it is necessary that, when a fish catches the decoy, its jaw presses the protuberant lever leg downward. If, on the other hand, the jaw of the fish does not catch the protuberant lever leg, the hooks do not spring out and the fish escapes. Another disadvantage is that the hooks spring out needlessly when any object in the water touches the protuberant leg of the angular lever.

To bring the hooks into a strained position, one side of the decoy body must be made so that it can be opened, for which reason one half of the body, which consists of two lengthwise halves, has been fastened with hinges to the other half and fitted with a locking device to keep it in the closed position. Such construction, however, makes the decoy asymmetrical in regard to its vertical middle plane and at the same time increases the production costs of the decoy.

Also known is a fish decoy with a longitudinal recess in its body for a spring-actuated hook. A bore extends from the front part of the body to the recess, which contains a setting pin of which the rear end reaches into the recess and the front part extends outside the front part of the decoy so that it can be attached to a snell which is attached to the fish line. In this case, a loop has been attached to the hook, and the end of the setting pin can be pushed into the loop when the hook is in the recess, in order to strain it against the effect of the spring which extends into the recess. The setting pin has been connected to the decoy body by means of a clamp, and the hook has been connected to the clamp by wire, such as spring wire.

A fish decoy of this type is, however, relatively expensive, because each decoy must have its own setting mechanism fitted permanently to the decoy body.

SUMMARY OF THE INVENTION

According to the invention there is now provided a fish decoy with a detachable plate member adapted to be inserted within the recess of the decoy body and said detachable plate member comprising a longitudinal bore extending from the front part of the plate member into the recess, a setting pin attached to a fish line and extending through the bore for slidable movement therein so that the rear end of the setting pin may protrude into the recess, a fish hook adapted to be positioned within said elongated recess and having a shank portion provided with a loop adapted to fit over the rear end of the setting pin when protruding into the recess, a spring member having one end attached to the plate member and the other end urged against the hook and adapted to eject the hook out of the body when the setting pin is released from the hook loop, means for preventing the setting pin from sliding forwardly out of the bore when the setting pin has released the loop, and a spring wire attached with one end of the hook and with the other end located at the forward end of the plate member so that the spring wire is flexed to be biased along the plate member surface when the hook is held in its retracted position but is free from the bias force when the hook is released.

Thus the longitudinal bore for the setting pin has been formed to extend through the plate member instead of the decoy body and the spring member has also been attached with one end to the plate member. As a result of this the setting mechanism may be detached from the decoy body.

A decoy according to the invention is very successful in catching fish, because the fork is released from the recess by a tightening of the line when a fish catches the lure. In addition, setting the hook in the strained position is very easy and quick, and the body of the decoy can be easily and quickly detached from the setting mechanism (plate member) and, if desired, transferred into another decoy body.

DESCRIPTION OF THE PREFERRED EMBODIMENT

Figure 1:
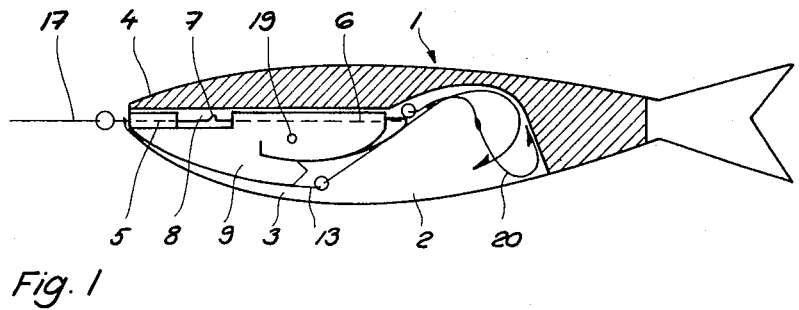
FIG. 1 shows a vertical lengthwise section of a trolling bait according to the invention, with the hook in the strained position in the hollow of the body.
Figure 2:
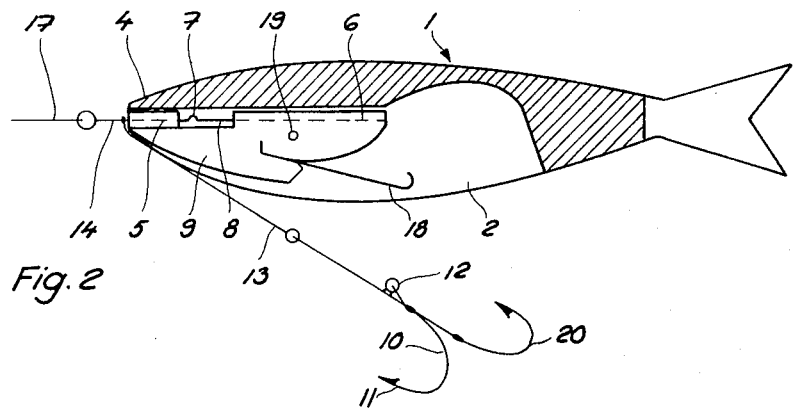
FIG. 2 shows the same view as FIG. 1, with the hook sprung out of the hollow.
Figure 3:
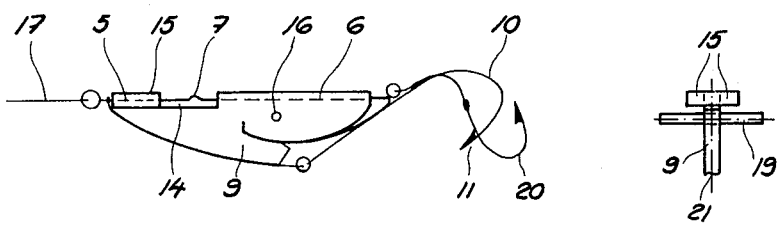
FIG. 3 shows a lure according to the invention, with the body detached.
Figure 4:
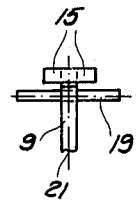
FIG. 4 shows the detached mechanism according to FIG. 3, seen from the front.

According to the drawing, a narrow slit-like recess 2 has been provided in body 1 of a fish decoy according to the invention, at approximately the middle of the body lengthwise, the body having been made from, for example, wood. This recess opens downward and continues as recess 3 to the front part of the body, that is, to end 4 of the decoy. Plate member 9 has been fastened transversally, so that it can be detached, into recess 3 between recess 2 and front part 4 of body 1 by means of pin 19 which can be pushed through hole 16 in plate member 9, so that the essentially straight upper edge of plate member 9 cannot move in body 1. The front part of plate member 9 has also been provided with transversal lobes 15 directed toward the opposite sides of plate member 9; lobes 15 are meant to be fitted to corresponding cuts in front part 4 of body 1 to facilitate the centering of plate member 9.

At the upper edge of plate member 9 there is a transversal recess which together with recess 3 in body 1 forms cavity 8 in which bead 7 of pin 14 has been fitted to move back and forth. Pin 14 has been respectively fitted to move longitudinally in front of the recess and back in bores 5 and 6 provided on the same straight line in the longitudinal direction of plate member 9.

For catching a fish, the fish decoy has been provided with angling hook 10 and possibly auxiliary hook 20; loop 12 has been attached to the shank of hook 10 at the end opposite to barbed point 11 for the purpose explained below, and auxiliary hook 20 has been attached to the loop. One end of the loop attached to the shank of hook 10 has preferably been connected to spring wire 13 the other end of which has been connected to pin 14. This pin runs in bores 5 and 6 and its middle part has been provided with bead 7 which is situated in cavity 8. The back end of pin 14 extends into recess 2 and its front end remains outside end 4 of the body. For trolling the decoy, snell 17 attached to a line not shown, can be connected to the front end of pin 14. Pin 14 and its bead 7 constitute a clamp to keep the decoy fastened to snell 17. In addition, flat spring 18 has been fitted inside body 1; one end attached and the free, upward curving end extending inside the lower part of recess 2. Furthermore, connecting pin 19 which can be attached to body 1 runs across recess 3.

When the alleged fish decoy according to the invention is prepared for fishing, spring wire 13 is placed in recess 3 and hook 10 is pressed into recess 2 against the effect of flat spring 18. When the hook is in this position, pin 14 is pushed backwards, at which time its back end, guided by bore 6, ends up in loop 12 attached to the fishing hook. Then, according to FIG. 1, hook 10, strained by flat spring 18 and spring wire 13 (in case wire 13 is a spring wire) remains inside hollow 2 while the end of pin 14 bends against loop 12 to such a position that barb 11 does not reach outside body 1. When pin 14 is pushed backwards, bead 7 also moves backwards in cavity 8.

When the decoy according to the invention is trolled in the normal manner or when it is reached after it has been cast with a fishing rod, the line tightens when a fish catches, and through snell 17 the line pulls pin 14 forward and the end of pin 14 is released from loop 12 of hook 10. At this time hook 10 is thrown out of recess 2 by flat spring 18 and possible spring wire 13 and catches the fish. When pin 14 is drawn out of loop 12, bead 7 simultaneously moves forward until it rests against the front wall of the cavity and keeps the decoy attached to snell 17.

Body 1 can be easily and quickly detached from the rest of the mechanism by pulling connecting pin 19 out of hole 16 in plate member 9 so that plate member 9 with its line and hooks can be removed from recess 2 and 3 of body 1.

It is clear that the hooks can as well be fitted to spring out of the back of the decoy or both from the stomach and the back, if so desired.

The decoy according to the invention can be used for trolling or casting even in waters with grass and reeds or those with brushwood and the like, because the hooks are hidden inside the body until a fish strikes the bait. However, there is nothing to prevent using the decoy for angling at the bottom.

What I claim is:

1. An improved fish decoy of the type having a body with an elongated recess open to at least one side of the body and a detachable plate member mounted in the recess, said member having comprising a longitudinal bore extending from the front part of the plate member into the recess, a setting pin attached to a fish line and extending through the bore for slidable movement therein so that the rear end of the setting pin may protrude into the recess, a fish hook attached to said pin and adapted to be positioned within said elongated recess and having a shank portion provided with a loop adapted to fit over the rear end of the setting pin when protruding into the recess, a spring member having one end attached to the plate member and the other end, in retracted position urged against the hook and adapted to eject the hook out of the body when the setting pin is released from the hook loop, means mounted on said decoy for preventing the setting pin from sliding forwardly out of the bore when the setting pin has released the loop, and a spring wire mounted at one end on the hook and at the other end on the forward end of the plate member so that the spring wire is flexed to be biased along the plate member when the hook is held in its retracted position but is free from the bias force when the hook is released.

2. The improved decoy of claim 1, in which the spring member is a flat spring one end of which is attached to the rear wall of the plate member the other end being adapted to be urged against the shank portion of the hook when the hook is held in its retracted position.

3. The improved decoy of claim 1, in which the spring wire extends along the bottom wall of the plate member from the point of attachment with the setting pin at the front of the plate member to the point of attachment with the hook in the recess.

4. The improved decoy of claim 3, in which a longitudinal groove is formed in the bottom wall of the plate member and extends from the recess to the front part of the plate member, and wherein the spring member is located in the longitudinal groove when the hook is held in its retracted position.

5. The improved decoy of claim 1, in which the means for preventing the setting pin from sliding forwardly out of the bore comprises a bead integrally formed on the setting pin and adapted to move therewith in a cavity in the plate member to co-operate with the front wall of said cavity in order to engage the plate member when the rear end of the setting pin slides into the bore releasing the hook.

6. The improved decoy of claim 1, in which the other end of the spring wire is slidably attached to the setting pin by means of a loose loop.

* * * * *